(12) United States Patent
Bora et al.

(10) Patent No.: US 9,229,638 B1
(45) Date of Patent: Jan. 5, 2016

(54) ADAPTIVE FLOW CONTROL FOR NETWORKED STORAGE

(75) Inventors: Bhaskar Bora, Karnataka (IN); Mark Halstead, Holliston, MA (US); Gaurav Mukul Bhatnagar, Karnataka (JP)

(73) Assignee: EMC Corporation, Hopkinton, MA (US)

( * ) Notice: Subject to any disclaimer, the term of this patent is extended or adjusted under 35 U.S.C. 154(b) by 559 days.

(21) Appl. No.: 13/161,587

(22) Filed: Jun. 16, 2011

(51) Int. Cl.
*G06F 3/00* (2006.01)
*G06F 3/06* (2006.01)

(52) U.S. Cl.
CPC ............ *G06F 3/0611* (2013.01); *G06F 3/0653* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 6,097,697 A * | 8/2000 | Yao et al. ...................... | 370/230 |
| 7,840,653 B1 * | 11/2010 | Cortes et al. .................. | 709/220 |
| 8,176,012 B1 * | 5/2012 | Rabii et al. .................... | 707/655 |
| 8,266,406 B2 * | 9/2012 | Kavuri .......................... | 711/170 |
| 2003/0208614 A1 * | 11/2003 | Wilkes .......................... | 709/232 |
| 2007/0130432 A1 * | 6/2007 | Aigo ............................. | 711/162 |
| 2011/0246556 A1 * | 10/2011 | Peterson et al. .............. | 709/203 |

* cited by examiner

*Primary Examiner* — Farley Abad
*Assistant Examiner* — Richard B Franklin
(74) *Attorney, Agent, or Firm* — Anderson Gorecki & Rouille LLP (57) ABSTRACT

In a networked storage system in which at least one primary data storage device is mirrored by a secondary data storage device, the primary device maintains data indicative of IO response rate of the secondary and capacity of a network via which the primary device is in communication with the secondary device. The primary device uses that data to determine whether to transmit an IO request to the secondary device. For example, the primary device may use the data to calculate loading of the secondary device based on IO response rate of the secondary device. The primary device may also increase its IO transmission rate if it is determined that the response rate of the secondary device is increasing, and decrease its IO transmission rate if it is determined that the response rate of the secondary device is decreasing. In order to avoid overloading the network the primary device compares the size of an IO request against the difference between perceived network capacity and utilized network capacity to determine whether sufficient network capacity exists for the IO request.

24 Claims, 8 Drawing Sheets

Figure 3 if max-jobs < 10 then 'jobs credit' is 16 if max-jobs < 20 (and more than 10) then 'jobs credit' is 12 if max-jobs < 30 (and more than 20) then 'jobs credit' is 8 if max-jobs < 40 (and more than 30) then 'jobs credit' is 4 if max-jobs >= 40 then 'jobs credit' is 1

ADAPTIVE FLOW CONTROL FOR NETWORKED STORAGE

CROSS-REFERENCE TO RELATED APPLICATIONS

N/A

FIELD OF THE INVENTION

This invention is generally related to data storage, and more particularly to networked storage arrays.

BACKGROUND OF THE INVENTION

Networked storage arrays can be used to maintain copies of data on different devices in different locations. Such mirroring of data is useful for various reasons including reducing the likelihood of catastrophic data loss. In order to mirror production or primary (source) site data to a secondary (target) site, a primary storage array (R1) is configured in a partner relationship with a remote storage array (R2). Alternatively, multiple primary devices may be paired with the secondary device. It is generally desirable to optimize throughput between the storage arrays.

SUMMARY OF THE INVENTION

In accordance with an embodiment of the present invention, a computer program stored on non-transitory computer-readable memory and used to implement a method comprises: maintaining, by a primary data storage device, data indicative of IO response rate of a secondary data storage device with which the primary device is associated and capacity of a network via which the primary device is in communication with the secondary device; and using the data, by a primary data storage device, to determine whether to transmit an IO request to the secondary device. For example, the primary device may use the data to calculate loading of the secondary device based on IO response rate of the secondary device. The primary device may also increase its IO transmission rate if it is determined that the response rate of the secondary device is increasing, and decrease its IO transmission rate if it is determined that the response rate of the secondary device is decreasing. In order to avoid overloading the network the primary device may compare the size of an IO request against the difference between perceived network capacity and utilized network capacity to determine whether sufficient network capacity exists for the IO request.

In accordance with another embodiment of the present invention, an apparatus comprises a primary data storage device having user data which is mirrored by a secondary data storage device, the primary data storage device maintaining data indicative of IO response rate of the secondary data storage device and capacity of a network via which the primary device is in communication with the secondary device, wherein the primary data storage device processes the data to determine whether to transmit an IO request to the secondary device.

At least one embodiment of the invention advantageously controls transmission of IOs at a primary device based on both network capacity and secondary device loading. In particular, an algorithm in accordance with an embodiment of the invention helps to reach an optimal "job level" at the primary site without overwhelming network resources or starving other devices. This can be accomplished independent of any user parameter or constant. Moreover, an algorithm in accordance with an embodiment of the invention is adaptive to both changing network conditions and secondary site load.

These and other advantages of the invention will be more apparent from the detailed description and the drawing.

DETAILED DESCRIPTION

Various aspects of the invention may be implemented partially or completely using computer program code. The computer program code is stored on non-transitory computer-readable memory and utilized by processing hardware. The program code may be provided as a computer program product or be integrated into network equipment.

Figure 1:
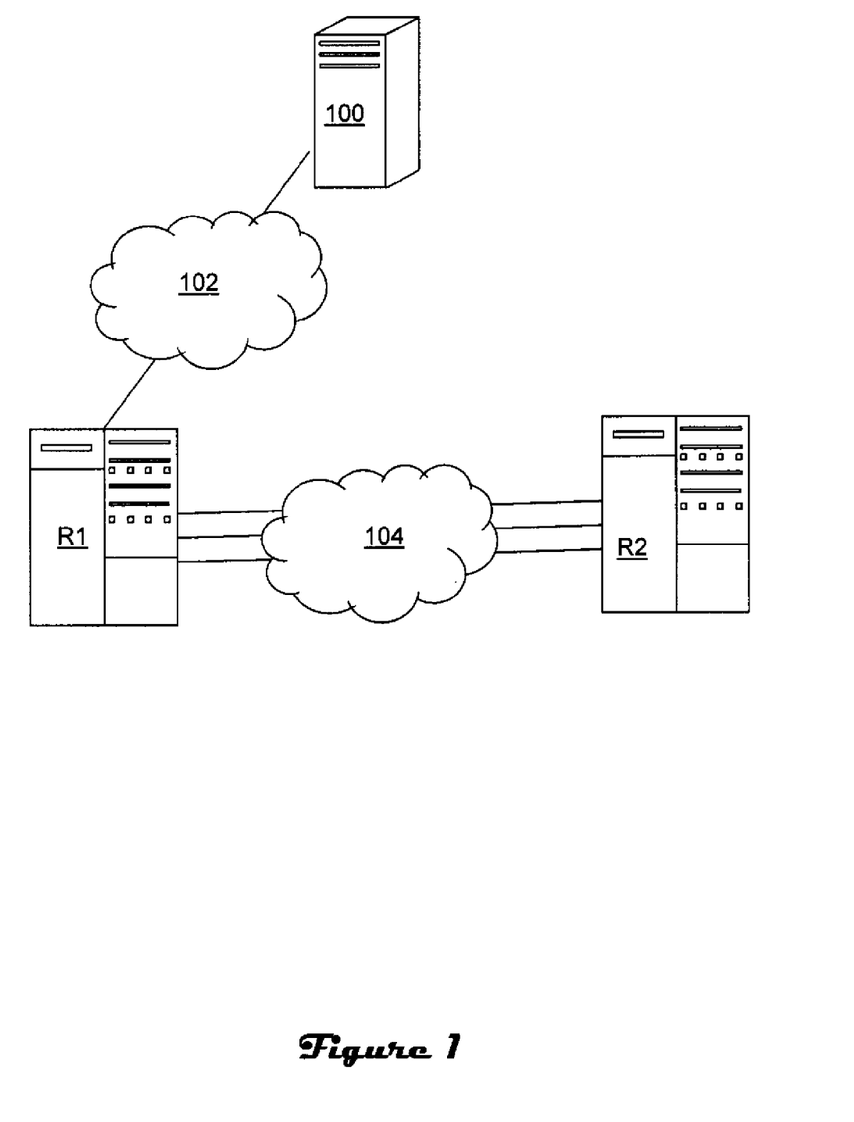
FIG. 1 illustrates a networked storage system in which aspects of the invention are implemented.

FIG. 1 illustrates a networked storage system in which aspects of the invention are implemented. At least one enterprise device 100 is in communication with a primary storage array R1 via a network 102. In order to mirror production or primary (source) site data to a secondary (target) site, the primary storage array R1 is configured in a partner relationship with a remote storage array R2 via a network 104. Typically, multiple communication links are used between R1 and R2. As will be described below, aspects of the invention help to balance the load on the links between R1 and R2.

Movement of data between the R1 and R2 devices is accomplished with exchanges known as IOs. For example, Read and Write operations are types of IOs. IO requests on the R1 device are queued before they are taken up for transmission to the R2 device. The time required to complete IOs is a function of primary and secondary site load, the transfer length of the IO, the type of IO and physical distance between the primary and secondary sites. Generally, aspects of the invention control IO request transmission (release) at the R1 device to achieve enhanced throughput, e.g., in terms of network bandwidth and IOs/second (IOPS). The IOPS will translate to the host response rate which is typically used to gauge performance of a storage system. It will therefore be appreciated that aspects of the invention together help to achieve optimal IO response with maximum network throughput.

In accordance with an embodiment of the invention, IO request transmission from primary device R1 is controlled based on bandwidth usage and loading of the secondary device R2. The primary device R1 maintains data indicative of IO response rate of the remote device R2 with which it is associated and capacity of the network which interconnects R1 and R2. The IO response rate is the number of IO requests completed over a unit of time, e.g., the last 1 sec. The network capacity is the number-of-bytes that R1 can have as total transfer size of all outstanding jobs with a specific R2 at any point in time. In other words, network capacity is the amount of data that R1 can put on the network at any point in time. The network capacity may be tracked and utilized on a single or multi-link basis. It should be noted that network capacity in this application is distinct from network bandwidth which is typically expressed in terms of bytes-per-second that the network can transfer. As will be explained in greater detail below, IO response rate is used to help ensure optimal loading on R2 and the difference between perceived network capacity and utilized network capacity is used to help utilize network resources efficiently.

Figure 2:
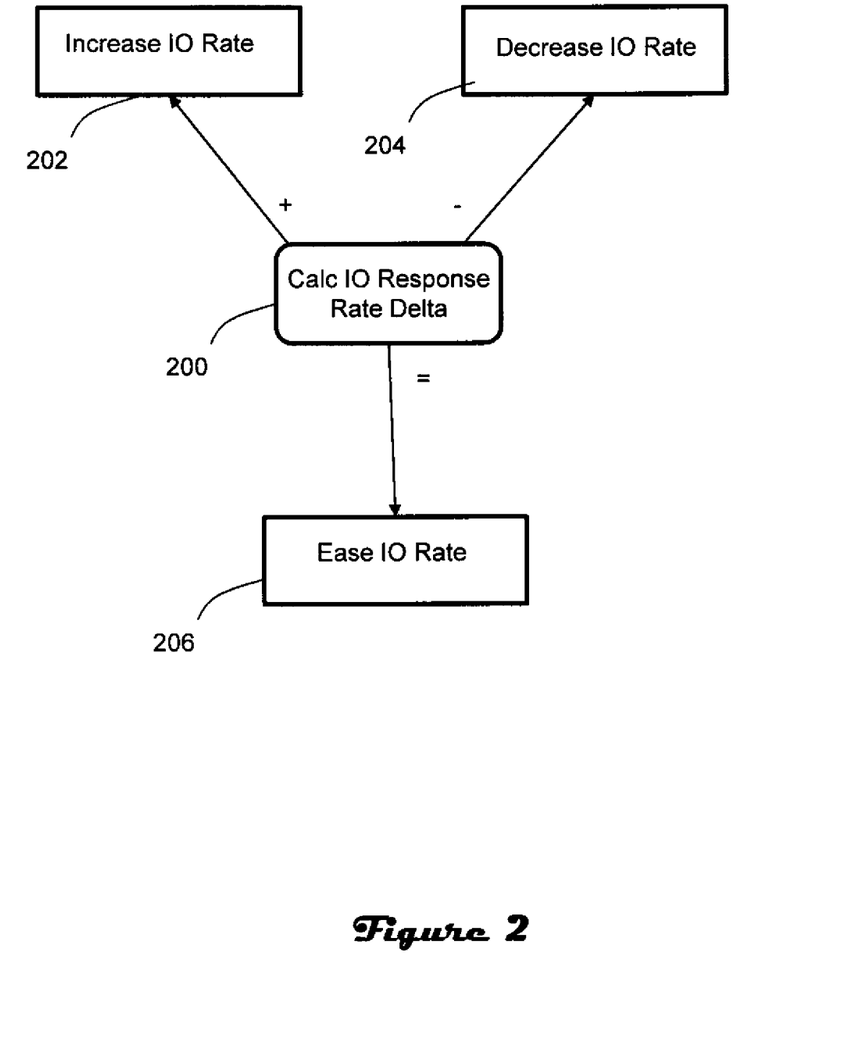
FIG. 2 illustrates a procedure for setting the load on the secondary device R2.

Referring to FIGS. 1 and 2, IO response rate is used to help ensure optimal loading on R2. In the illustrated embodiment IO transmission to R2 is a function of the average response rate of R2. R1 calculates the average response as the number of acknowledgements R1 receives from R2 in a selected period of time, e.g. one sec. If the R1 device is connected to multiple R2 devices the response rate is the running average of all response rate values for each of the target devices R2 to which the R1 device is connected. An indication of average response rate is calculated and maintained by R1 for each R1-R2 link. Consequently, two links between R1 and R2 will result in two distinct sets of flow control parameters including 'avg R2 response rate.' The R1 device reassess this rate at the end of each time period, e.g. every one sec, to calculate the change in response rate (delta) as indicated in step 200. If R1 finds that R2 response rate is increasing (positive delta) then R1 will increase the rate of IO transmission as indicated in step 202, thereby sending more IOs to R2 in the next time period. If R1 finds that the R2 response rate is decreasing (negative delta) then R1 will decrease the rate of IO transmission as indicated in step 204, thereby sending fewer IOs to R2 in the next time period. If R1 finds that the R2 response rate is unchanged (no delta) then R1 will slightly decrease the rate of IO transmission as indicated in step 206. Because performance of R2 as a function of load is nonlinear, setting the rate of IO transmission to achieve maximum loading of R2 (assuming unlimited network capacity) would not achieve optimal throughput. For example, maximum throughput is not necessarily achieved at the maximum possible load. However, IO response rate is indicative of efficiency under load and can therefore be used to achieve better throughput.

Figure 3:
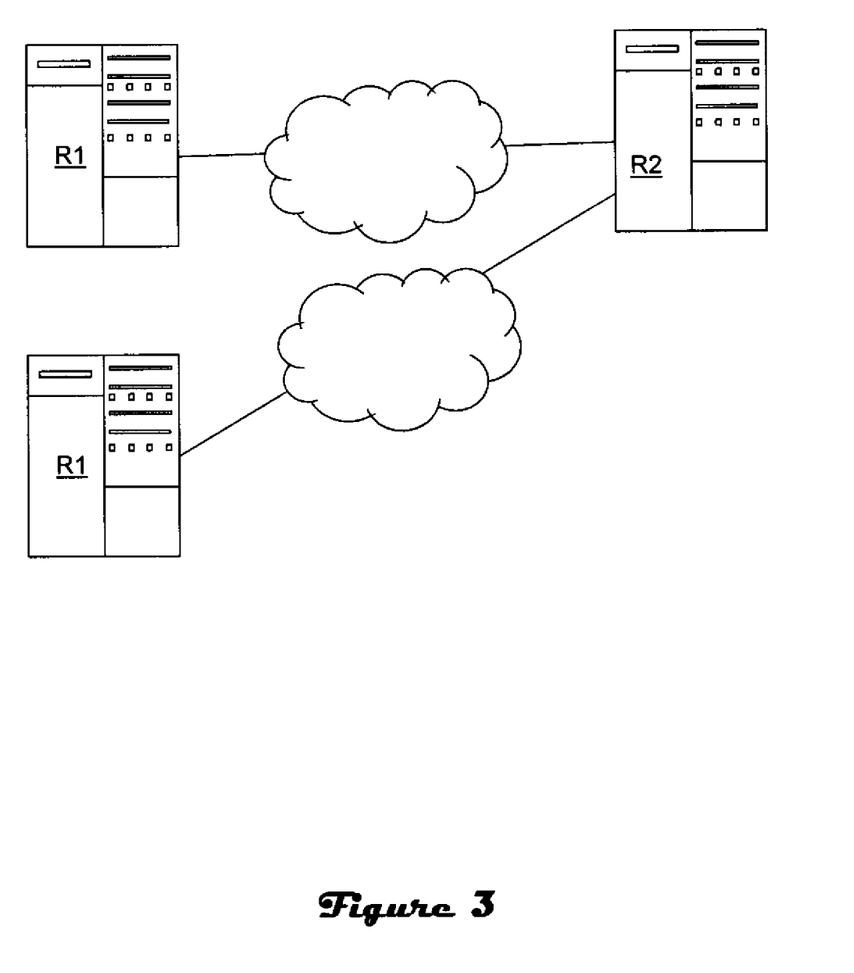
FIG. 3 illustrates an alternative networked storage system in which multiple primary devices R1 are associated with a secondary device R2.
Figure 4:
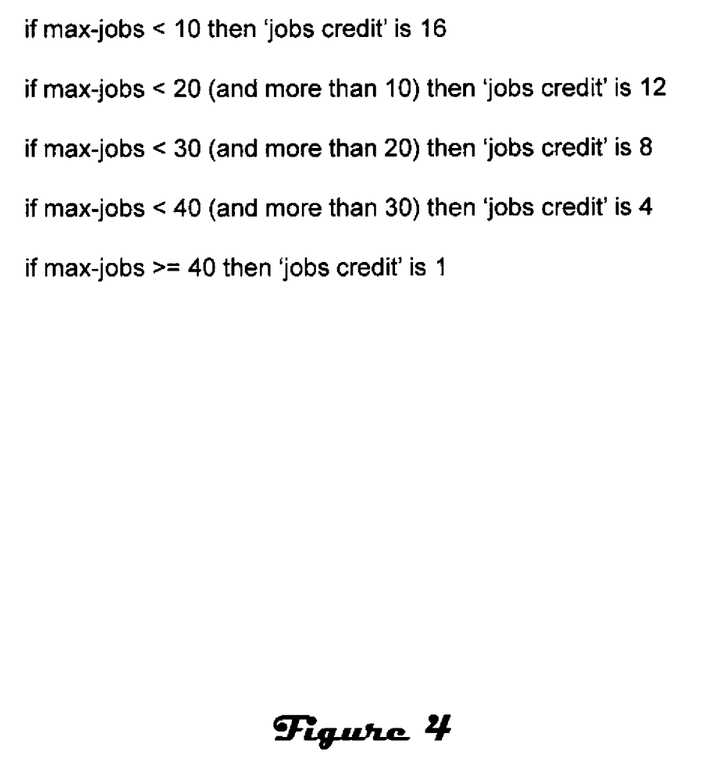
FIG. 4 illustrates a procedure to adjust the maximum number of IOs that a device is permitted to transfer.

Referring to FIGS. 3 and 4, a max-jobs variable defining the maximum number of IOs that an R1 device is allowed to transfer at any given time is maintained to help balance loading and avoid starvation where more than one R1 device is connected to the same R2. The max jobs variable is set to an initially minimal value, for example and without limitation max jobs may initially be set to 10. Max-jobs is then reassessed and set at the end of each time interval to the number of IOs completed in the last time interval. A jobs credit variable defines how many extra IOs in addition to max jobs R1 can open in the next time interval. Conceptually, the number of job-credits controls whether R1 pushes more or less IOs based on the current job level in order to more quickly reach an optimal level. At least one job-credit is provided in order to avoid starvation. As indicated in the drawing, the value of jobs credit decreases with the increase of max-jobs, but not below the value 1. Consequently, an R1 that is more heavily loading R2 is not permitted to load R2 with many extra IOs, but an R1 that is not heavily loading the R2 is permitted to do so. Over a series of intervals of time this difference in values of jobs credit will result in reduction of max jobs for the R1 that is more heavily loading R2 and increase of max jobs for the R1 that is less heavily loading the R2 until the loads are balanced.

Figure 5:
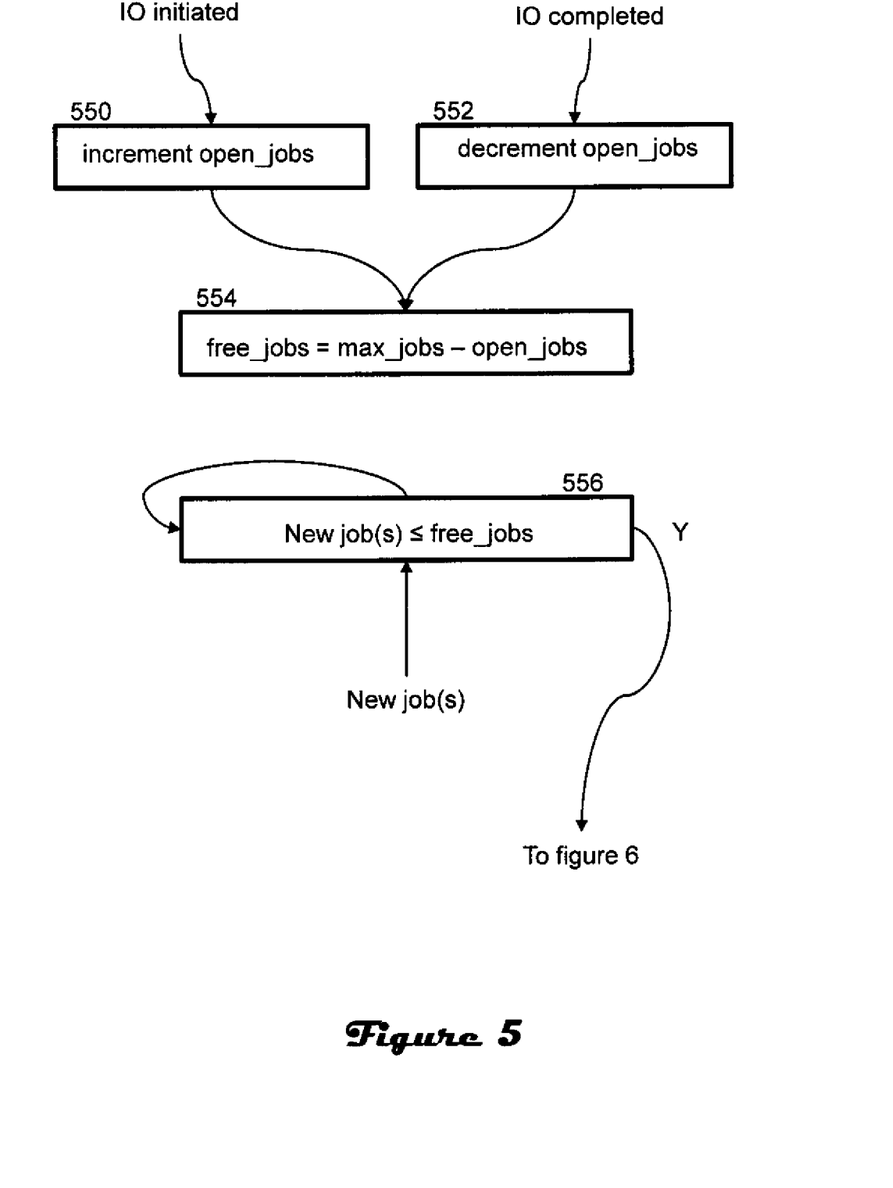
FIG. 5 illustrates a procedure for determining whether to open a job based on free max-jobs.

FIG. 5 illustrates a procedure for determining whether to open a new job (transmit an IO) based on free (available) jobs. As already described above, R1 maintains an indication of max-jobs for each time interval. R1 also maintains an open-jobs variable indicative of the number of open jobs at any point in time. For example, when an IO transfer is initiated for an IO request open-jobs is incremented by one as indicated in step 550, and when an IO request is completed open-jobs is decremented by one as indicated in step 552. The number of free jobs at any given point in time is calculated in step 554 as the difference between max jobs and open-jobs (free_jobs=max_jobs−open_jobs). A new job is only opened if at least one free job is available as indicated by step 556. If a free-job is not available then the request is postponed until free-jobs become available, e.g., because at least one IO has been completed. When a free-job is available the procedure continues as indicated in FIG. 6.

Figure 6:
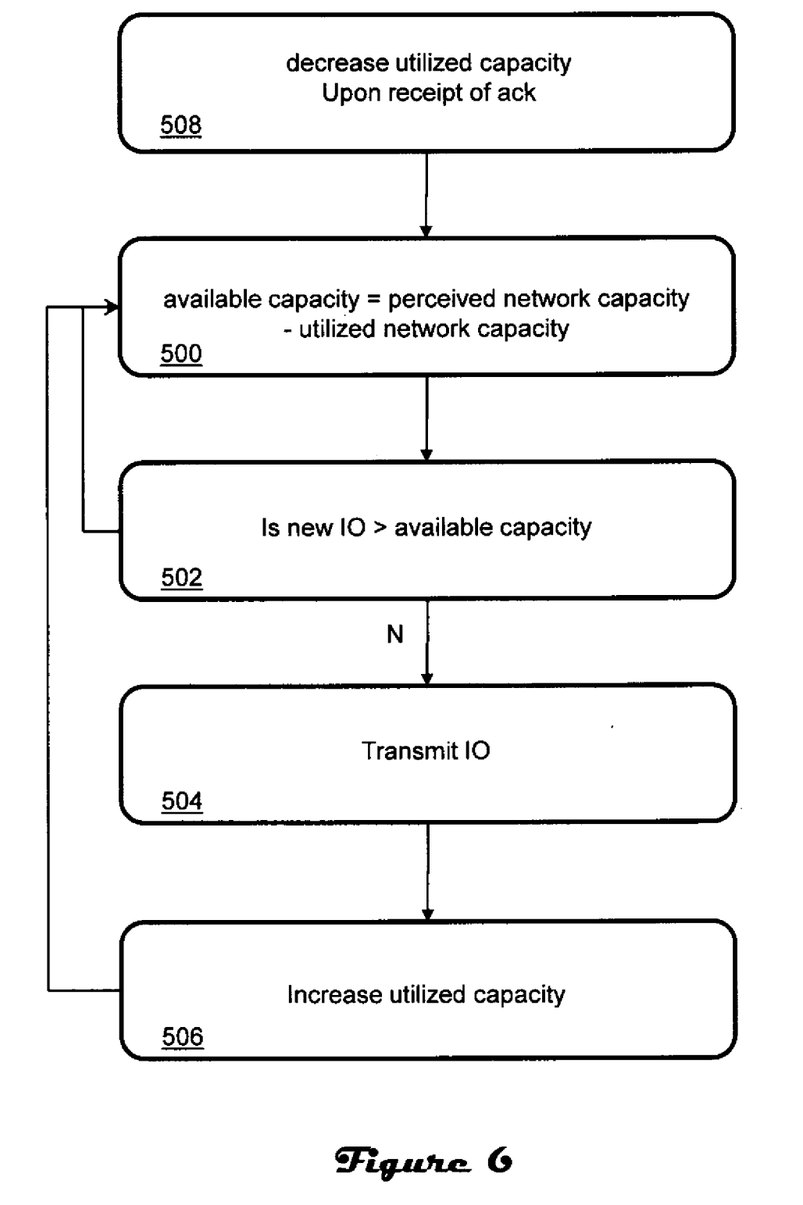
FIG. 6 illustrates a procedure for controlling transmission of IOs based on availability of network capacity for those IOs as determined at the primary device R1.

Referring now to FIG. 6, the adaptive algorithm also controls transmission of IOs based on availability of network capacity for those IOs as determined at R1. This can be done based on the size of a new IO to be transmitted and perceived capacity at a point in time. For example, the IO will be opened if putting that IO on the link will not exceed the difference between perceived network capacity of the link and utilized network capacity. For the purposes of this description, provisioned network bandwidth is the bandwidth provisioned for the links between R1 and R2, e.g., the amount of bandwidth which is supposed to be physically available but cannot be exceeded. Perceived network capacity is the network capacity calculated to be available to R1 for IOs at a point in time in terms of units of blocks or bytes, excluding network layer protocol header bytes. Utilized network capacity is the actual consumed capacity by various R1 IOs at any given point in time. In other words sum total of the transfer sizes of all the unfinished IOs. Available capacity is the perceived network capacity less utilized network capacity, calculated as indicated in step 500. When flow control is about to open an IO ('write' request) the adaptive algorithm checks the transfer size of the IO against the available 'write' capacity as indicated by step 502. If sufficient free capacity is available for the IO then the algorithm will allow the IO to start as indicated by step 504. Once the IO is started its data transfer length is included (added) to the utilized capacity as indicated by step 506. Once the IO is completed its data transfer length is removed (subtracted) from the utilized capacity as indicated by step 508. Read capacity is treated like Write capacity except that the congestion reporting is done by R2 (R2 will pass congestion indication through acknowledgements sent by it to R1).

Figure 7:
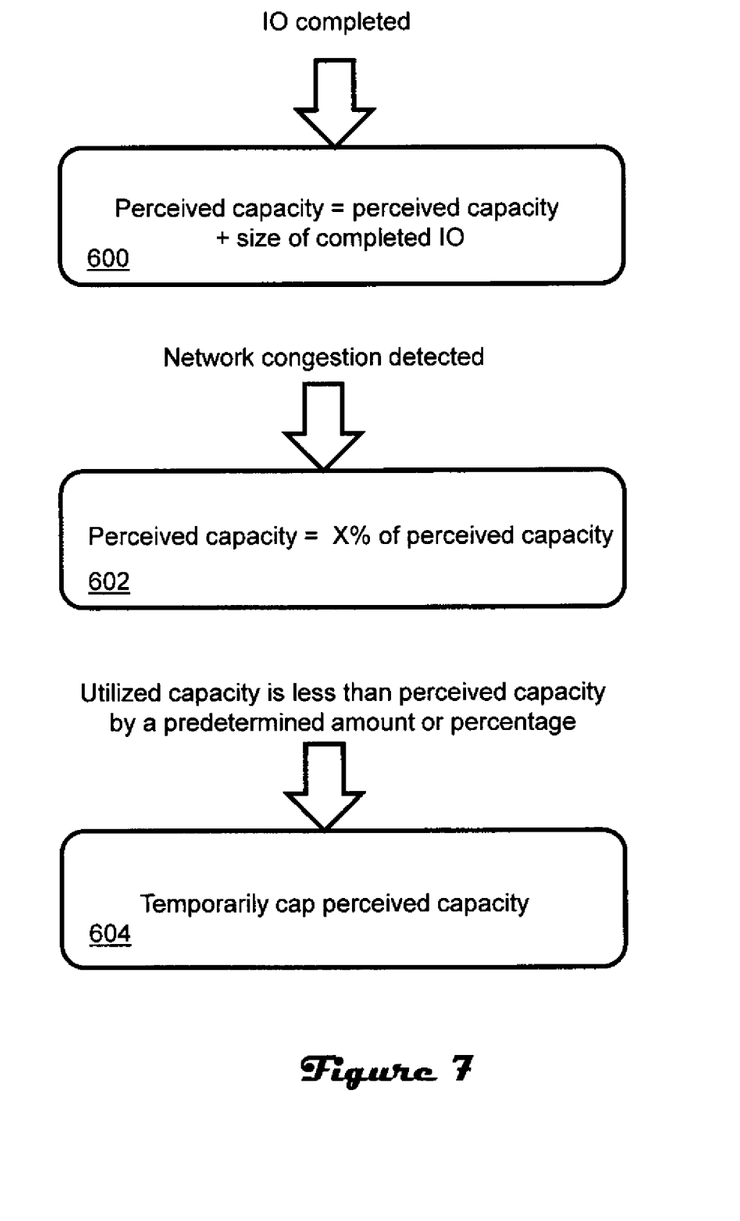
FIG. 7 illustrates operations for calculating perceived capacity.

Referring to FIG. 7, the adaptive flow control algorithm calculates perceived network capacity based on completion of IOs. From an initial setting, e.g., 64 Kbytes, the algorithm increases a variable indicative of perceived network capacity upon completion of each IO. In particular, perceived network capacity is increased by an amount equal to the data transfer size of the completed IO as indicated by operation 600. The completion of the IO tends to suggest that the bandwidth utilized for the transfer is now available. For example, after completion of a 64 Kbyte transfer the initially setting of 64 Kbytes is increased to 128 Kbytes. Note that provisioned network bandwidth for the link could be 4 Gbits/sec although the perceived capacity is just 1 Mbits (or 128 KBytes). After completion of a subsequent 128 Kbyte IO the perceived capacity is increased to 256 Kbytes.

The calculation of perceived network capacity is also based on network congestion. It will be appreciated that the procedure described above will increase perceived capacity exponentially. Eventually, network congestion may be encountered. The adaptive algorithm will decrease the variable indicative of perceived capacity by some predetermined amount or percentage (less than 100%) in response to detection of network congestion as indicated by operation 602. For example and without limitation, on detecting congestion the perceived network capacity might be reduced by 20%. As a result of operations 600 and 602, the adaptive algorithm will increase perceived capacity upon every IO job until congestion is encountered, and then tend to cyclically increase and decrease perceived capacity based on completion of IOs and detection of network congestion.

Figure 8:
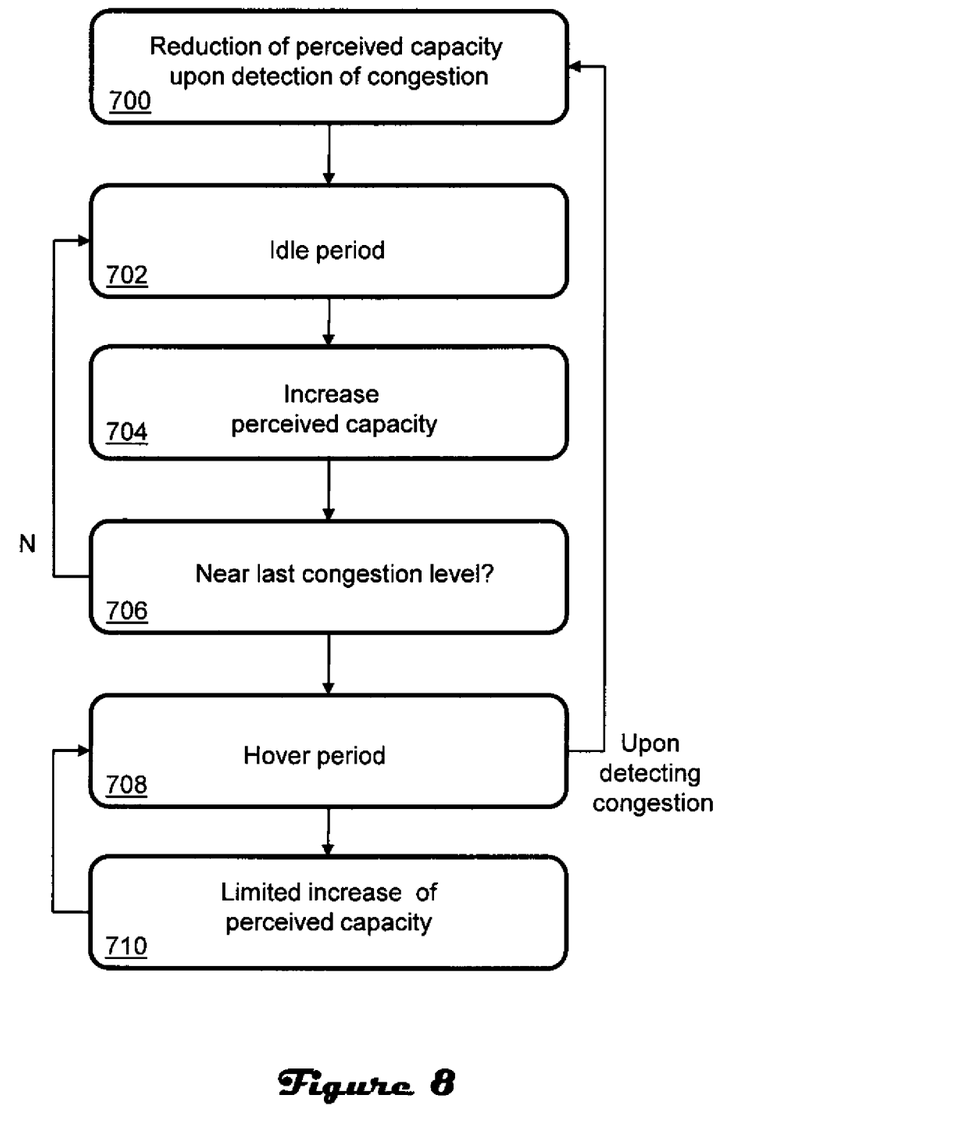
FIG. 8 illustrates a procedure for damping the increase of perceived capacity after encountering congestion.

Referring to FIG. 8, the increase of perceived capacity may be dampened after encountering congestion. For example and without limitation, perceived capacity might be reduced by 20% or some other percentage upon initial detection of network congestion as indicated by step 700. The algorithm then enters an idle ramp-up period where no increase of perceived capacity is allowed as indicated by step 702. This lasts for some predetermined period of time, e.g., 1 or 2 seconds after the congestion is detected. Once the idle-ramp period is over the perceived capacity is rapidly increased, e.g., exponentially, as indicated by step 704. For example, on receipt of an IO acknowledgement the perceived capacity is increased by the amount of data transfer for which the acknowledgement was received. The algorithm then determines whether the most recent congestion level is within a predetermined range of perceived capacity as indicated by step 706. Once perceived capacity reaches a certain level relative to the last congestion level, e.g., 80% of the last congestion level, the increase of perceived capacity is dampened relative to the increase in step 704, e.g., a linear increase. This can be accomplished by ramping up once in every five acknowledgements or so. When the perceived capacity meets the level at which congestion was previously encountered the increase of perceived capacity is halted for some predetermined period of time (hover period) as indicated by step 708, e.g., 30 sec. At the end of hover period the perceived capacity is permitted a limited increase as indicated by step 710. For example, perceived capacity may be permitted to increase once (based on one IO completion) and is then held steady for a second hover period. The second hover period may be shorter than the first hover period, e.g., half the duration of the previous hover period. This procedure can continue iteratively, or the hover period may be reduced to some minimum value such as 2 seconds. Upon detection of congestion flow returns to step 700.

Referring again to FIG. 7, the adaptive flow control algorithm may also have a control to avoid increasing perceived capacity beyond a limit. For example, perceived capacity may be capped if utilized capacity is less than perceived capacity by a predetermined amount or percentage as indicated by step 604. As an illustration, if perceived capacity is 1 Gb and the utilized capacity is just 500 Mb, further increase of perceived capacity is halted. Later, if utilized capacity increases beyond 500 Mb and perceived capacity is unchanged then the relationship between perceived capacity and actual utilization will prompt the algorithm to enable increasing the perceived capacity, thereby allowing headroom for more data to be put on the link. The algorithm may implement this feature by halting increase of the perceived capacity if the difference between the perceived capacity and the utilized capacity is more than or equal to some predetermined percentage of allowed capacity, e.g. and without limitation 40%. Once the difference drops below the predetermined percentage the algorithm allows the perceived capacity to be increased.

While the invention is described through the above exemplary embodiments, it will be understood by those of ordinary skill in the art that modification to and variation of the illustrated embodiments may be made without departing from the inventive concepts herein disclosed. Moreover, while the embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A computer program stored on non-transitory computer-readable memory and used to implement a method comprising:
maintaining, by a primary data storage device, data indicative of IO response rate of a secondary data storage device with which the primary data storage device is associated in a mirrored partner relationship and capacity of a network via which the primary data storage device is in communication with the secondary data storage device; and
using the data, by the primary data storage device, to determine whether to transmit an IO request associated with mirror maintenance from the primary data storage device to the secondary data storage device.

2. The computer program of claim 1 including calculating loading of the secondary data storage device based on IO response rate of the secondary data storage device.

3. The computer program of claim 2 including calculating change of response rate of the secondary data storage device over successive periods of time.

4. The computer program of claim 3 including adjusting an IO transmission rate by increasing the IO transmission rate if it is determined that the response rate of the secondary data storage device is increasing, and decreasing the IO transmission rate if it is determined that the response rate of the secondary data storage device is decreasing.

5. The computer program of claim 1 including setting a first variable defining a maximum number of IOs that the primary data storage device is allowed to transfer at any given time.

6. The computer program of claim 5 including increasing the maximum number of IOs that the primary data storage device is allowed to transfer by a second variable that is inversely related to the first variable.

7. The computer program of claim 1 wherein the IO request has a known size, and including comparing the size of the IO request against the difference between perceived network capacity and utilized network capacity to determine whether sufficient network capacity exists for the IO request.

8. The computer program of claim 7 including, in response to completion of an IO, increasing a variable indicative of perceived network capacity by an amount related to size of the completed IO.

9. The computer program of claim 8 including, in response to detection of network congestion, decreasing the variable indicative of perceived capacity.

10. The computer program of claim 9 including limiting increase of the variable indicative of perceived capacity as a function of utilized capacity.

11. The computer program of claim 9 including damping increase of perceived capacity in response to detection of network congestion.

12. The computer program of claim 11 including damping increase of perceived capacity as a function of a relationship between perceived capacity and a level at which congestion was detected.

13. Apparatus comprising:

a primary data storage device having user data which is mirrored by a secondary data storage device, the primary data storage device maintaining data indicative of IO response rate of the secondary data storage device and capacity of a network via which the primary data storage device is in communication with the secondary data storage device, wherein the primary data storage device processes the data to determine whether to transmit an IO request associated with mirror maintenance from the primary data storage device to the secondary data storage device.

14. The apparatus of claim 13 wherein the primary data storage device calculates loading of the secondary data storage device based on IO response rate of the secondary data storage device.

15. The apparatus of claim 14 wherein the primary data storage device calculates change of response rate of the secondary data storage device over successive periods of time.

16. The apparatus of claim 15 wherein the primary data storage device adjusts an IO transmission rate by increasing the IO transmission rate if it is determined that the response rate of the secondary data storage device is increasing, and decreasing the IO transmission rate if it is determined that the response rate of the secondary data storage device is decreasing.

17. The apparatus of claim 13 wherein the primary data storage device sets a first variable defining a maximum number of IOs that the primary data storage device is allowed to transfer at any given time.

18. The apparatus of claim 17 wherein the primary data storage device increases the maximum number of IOs that the primary data storage device is allowed to transfer by a second variable that is inversely related to the first variable.

19. The apparatus of claim 13 wherein the IO request has a known size, and wherein the primary data storage device compares the size of the IO request against the difference between perceived network capacity and utilized network capacity to determine whether sufficient network capacity exists for the IO request.

20. The apparatus of claim 19 wherein the primary data storage device, in response to completion of an IO, increases a variable indicative of perceived network capacity by an amount related to size of the completed IO.

21. The apparatus of claim 20 wherein the primary data storage device, in response to detection of network congestion, decreases the variable indicative of perceived capacity.

22. The apparatus of claim 21 wherein the primary data storage device implements a limited increase of the variable indicative of perceived capacity as a function of utilized capacity.

23. The apparatus of claim 21 wherein the primary data storage device dampens increase of perceived capacity in response to detection of network congestion.

24. The apparatus of claim 23 wherein the primary data storage device dampens increase of perceived capacity as a function of a relationship between perceived capacity and a level at which congestion was detected.

* * * * *